United States Patent [19]

Richardson et al.

[11] 3,928,903

[45] Dec. 30, 1975

[54] METHOD OF MAKING A DOUBLE-WALLED PIPE ASSEMBLY

[75] Inventors: Bart D. Richardson; Michael L. Waggoner, both of Anchorage; Alaska

[73] Assignee: Atlantic Richfield Company, Los Angeles, Calif.

[22] Filed: Jan. 29, 1975

[21] Appl. No.: 545,011

[52] U.S. Cl. ............... 29/407; 29/445; 29/455; 138/113; 285/47; 285/138
[51] Int. Cl.² .................................. B23Q 17/00
[58] Field of Search ...... 29/455, 445, 407; 138/113; 403/343; 285/47, 354, 357, 133, 138, 140

[56] References Cited
UNITED STATES PATENTS

| | | | |
|---|---|---|---|
| 131,390 | 9/1872 | Brennan et al. | 285/133 X |
| 1,134,930 | 4/1915 | Theriot | 285/138 X |
| 2,366,547 | 1/1945 | Oak | 285/138 X |
| 2,722,238 | 11/1955 | Stuvel | 285/138 X |
| 2,949,852 | 8/1960 | Schaefer | 29/455 UX |
| 2,962,810 | 12/1960 | Gilmore | 29/445 |
| 3,077,030 | 2/1963 | Carlson | 29/407 |
| 3,511,282 | 5/1970 | Willhite | 138/113 |

Primary Examiner—Charlie T. Moon
Attorney, Agent, or Firm—Roderick W. MacDonald

[57] ABSTRACT

A double-walled pipe assembly for use in a permafrost zone in a wellbore in the earth composed of inner and outer concentric spaced-apart pipes rigidly fixed apart by use of threaded annular connector means which are screwed into the annulus between the pipes at either end of the assembly. The connector means is of substantial size and strength notwithstanding the potential heat loss therethrough so that the connection can withstand without plastic deformation the force requirements to which it is to be subjected.

A method for making a double-walled assembly using only threaded connector means wherein the outer wall of the inner pipe and the inner wall of the outer pipe are threaded in a manner so that it is known exactly where the threads start on each pipe and each connector means is also threaded on its inner and outer walls in a manner such that the threads start at the same point on the connector means. The inner and outer pipes are then arranged in a concentric spaced-apart relation with the thread start marks aligned with one another. The connector means are then screwed into the annulus between the two pipes by first aligning the thread start mark on the connector means so that it is between the thread start marks on the two opposing pipes.

3 Claims, 11 Drawing Figures

METHOD OF MAKING A DOUBLE-WALLED PIPE ASSEMBLY

BACKGROUND OF THE INVENTION

Heretofore in the production of warm fluids such as petroleum gas and/or petroleum liquid from a wellbore in the earth through a permafrost zone whereby part of the permafrost could be melted upon continued exposure to heat from the warm fluid, it has been proposed to employ double-walled pipes to provide thermal insulation between the warm fluid passing through the well and the permafrost in the wall of the well. A good background reference in this area is U.S. Pat. No. 3,680,631, the disclosure of which is incorporated herein by reference.

In forming double-walled assemblies for use in a well, it has been proposed that a spacer means be welded between the two pipes to form the assembly but it has been found undesirable from a metallurgical point of view to do substantial welding to the type of steel normally used in wells completed through a permafrost zone.

It has also been proposed to use a diaphragm connection means which is very small in size, e.g., about 0.02 inch in longitudinal length parallel to long axes of the pipes, to minimize the heat loss through this connector since the connector does provide a metallic contact between the inner and outer pipes of the assembly. These thin connectors are deliberately designed to flex with the expansion and contraction of the pipes under normal well conditions. However, such a thin connector is very weak and provides the substantial disadvantage of a nonrigid assembly. A nonrigid assembly is more prone to damage and even failure during handling, installation, and/or use in the well because the connector can plastically deform under these normal stresses. Also, since the connector is designed to operate in the elastic region under normal use in the well, the fatigue life of the connector over the many years that the well will be in use could be a substantial factor in whether the pipe assembly lasts as long as the well.

It has now been found that connector means of sufficient size and strength to form an essentially rigid assembly can be employed without intolerable heat loss and without welding.

SUMMARY OF THE INVENTION

According to this invention an assembly of inner and outer pipes which is essentially rigid, i.e., its connector means will not plastically deform under normal stresses, and quite rigid compared to an assembly using a thin diaphragm connector means is provided. By this invention, the inner and outer pipes are rigidly joined to one another at their opposing ends in the annulus between the pipes by use of an annular threaded connector means that is of sufficient overall length and thread length so as to provide a connection which can withstand substantially all of the force requirements to which the assembly is to be subjected during handling, installation, and use in the well.

This invention also provides a method whereby the threaded ends of the pipes to be joined together to form the double-walled assembly are threaded in such a manner that the starting point of the threads on both ends of each pipe are known and can be aligned with one another and the connector means, which are threaded on the inside and outside, have their threads started at the same point so that this point of thread start can be aligned between the points of thread start of the inner and outer pipes. The connector means will then readily screw into the annulus between the inner and outer pipes to form the rigid connection desired for this invention even though the inner and outer pipes are relatively unmovable while starting the connector means into the annulus.

Accordingly, it is an object of this invention to provide a new and improved method and apparatus for producing wells through a permafrost zone. It is another object to provide a new and improved method and apparatus for thermally insulating pipe in a wellbore. It is another object to provide a new and improved method and apparatus for producing hot fluid through permafrost without substantially melting the permafrost. It is another object to provide a new and improved method and apparatus for thermally insulating at least part of a wellbore in a manner wherein the insulating assemblies are sufficiently rigid and strong to withstand normal handling, emplacement, and use in the wellbore.

Other aspects, objects, and advantages of this invention will be apparent to those skilled in the art from this disclosure and the appending claims.

DETAILED DESCRIPTION OF THE INVENTION

Figure 1:
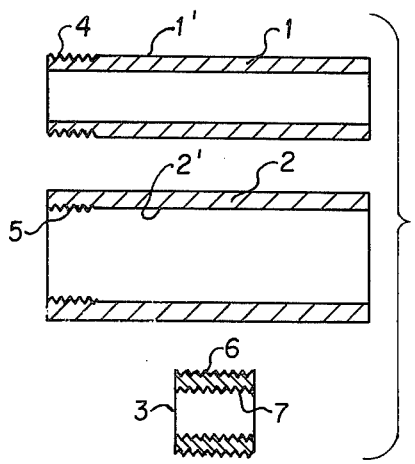
FIG. 1 shows a cross section of two sections of pipe and a single connector means according to this invention.

More specifically, FIG. 1 shows a first (inner) pipe 1 and a second (outer) pipe 2. Pipe 1 has a smaller outside diameter than the inner diameter of pipe 2 so that when pipe 1 is inserted concentrically into pipe 2 there is an open annulus between the outer surface 1' of pipe 1 and the inner surface 2' of pipe 2. Annular connector means 3 threadably fits inside this annulus. Pipe 1, on a first end thereof, is threaded on its outside surface 1' at 4 while pipe 2, on a first end thereof, is threaded on its inside surface 2' at 5, threads 4 and 5 both being of the same rotational direction, i.e., both being right-handed threads or both being left-handed threads, and of the same pitch. Threads 4 and 5 mate with threads 6 and 7 which are on the outer and inner surfaces, respectively, of connector 3. The threads can be of any type known in the art such as buttress threads, modified buttress threads, and the like.

In accordance with one embodiment of this invention, the starting point of threads 4 on pipe 1 is marked by a scribe mark or other indicia means at 10. Similarly, the starting point for threads 5 on pipe 2 is shown by mark 11. The starting point of both threads 6 and 7 on connector 3 is at the same point which point is shown at 12.

When connecting the first ends of these pipes the two pipes can be rotated relative to one another because the second ends of the pipes are not yet connected to one another. Accordingly, on the first end of the pipes thread start marks can be omitted but then the pipes have to be rotationally adjusted until the threads are aligned so that the threads on the connector will start in both pipes at the same time. If it is not desired to rotationally adjust very large and heavy pipes the thread start marks can be used. Thread start marks cannot be omitted from the second ends of the pipes because the pipes cannot be rotationally adjusted since their first ends are connected.

Figure 3:
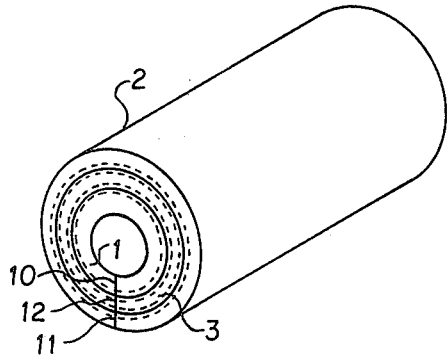
FIG. 3 shows an end view of an assembly of the pipe and connector means of FIG. 1.

When pipe 1 is inserted into pipe 2 and held in a spaced-apart relation to define the annulus between the two pipes which is to receive connector 3, thread start marks 10 and 11 on the two pipes are aligned with one another as shown in FIG. 3 and held in this position so that when connector 3 is started its thread start marks 12 are aligned between thread start marks 10 and 11 on the two opposing pipes thereby insuring that the threads on the inside and the outside of connector 3 will mate with the threads on the two opposing pipes at the same time and the connector can be screwed into the annulus without binding on threads 4 or 5 because of misalignment of those threads relative to one another.

When connector 3 is screwed into the annulus to the desired extent, that end of the assembly is completed as shown in FIG. 3, unless part of connector 3 extends beyond the end of pipes 1 and 2 in which case the exposed end of the connector would be cut or machined off to make a smooth, flush connection. The start marks 10, 11 and 12 need not be aligned upon completion of the assembly as shown in FIG. 3 but are merely shown that way in FIG. 3 for convenience sake.

Figure 4:
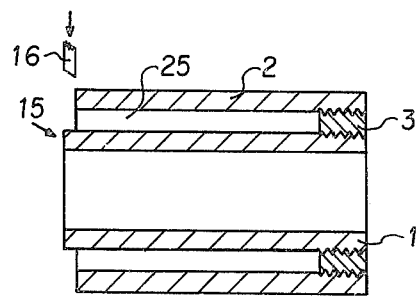
FIG. 4 shows a cross sectional view of the assembly of FIG. 3 where the unconnected ends of the pipes are not threaded.
Figure 5:
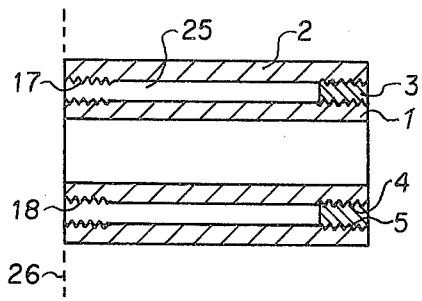
FIG. 5 shows the assembly of FIG. 4 after the unconnected ends have been threaded.

If pipes 1 and 2 are not of essentially the same length, then the unconnected ends of the assembly will not be even with one another as shown at 15 in FIG. 4. It is preferred that the ends be machined by way of tools 16 so that the unconnected ends of the assembly be in substantially the same plane, this plane being preferably substantially perpendicular to the long axes of pipes 1 and 3 as shown by 26 in FIG. 5. Thereafter, as also shown in FIG. 5, the unconnected ends are threaded as shown at 17 and 18. Threads 17 and 18 are of the same rotational direction and same pitch. These ends can be threaded at the same or different times, but, according to this invention, the start points of both threads are aligned and started at the same relative points as shown by marks 19 and 20 in FIG. 6. A second connector means 21 whose inner and outer threads 22 and 23 start at the same point thereon as shown by mark 24 is then inserted into annulus 25 with its thread start mark 24 aligned between thread start marks 19 and 20 and is screwed into annulus 25 a desired distance. This completes the assembly as shown in FIG. 7.

Connector means 3 and 21 are of substantial length such as from about two inches up to about four inches and are threaded over their full length so that a substantial amount of interlocking threads between the connecting means and the inner and outer pipes is effected thereby providing an essentially rigid (not plastically deformable under normal stresses) connection between the two pipes. The final assembly, because of the large amount of interconnecting teeth on both connectors, can withstand essentially all of the force requirements to which the assembly is to be subjected during transportation, handling on the earth's surface at the well site, emplacement into the wellbore, and use in the wellbore. Thus, connectors 3 and 21 are essentially nonyielding rigid members of substantial size and strength which rely only on thread means for the connecting function.

Figure 7:
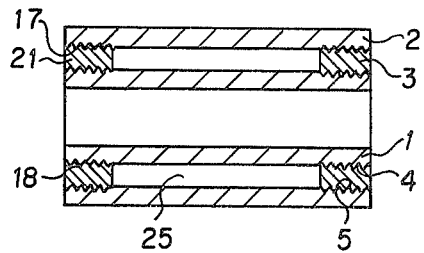
FIG. 7 shows the connector means of FIG. 6 in place in a cross section of the completed assembly.
Figure 8:
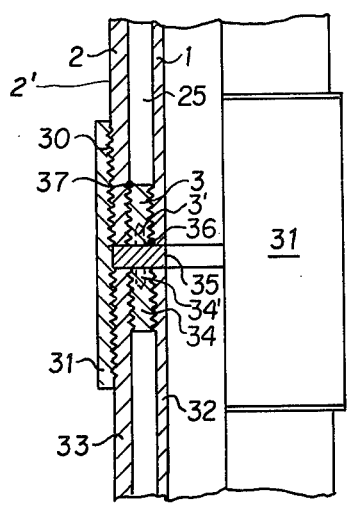
FIG. 8 shows a partial cross section of two assemblies of FIG. 7 joined together as they would appear in the wellbore itself.

FIG. 8 shows one end of the assembly of FIG. 7 wherein the outer surface 2' of pipe 2 has been threaded at 30 to receive an internally threaded conventional joint (collar) means 31. Joints 31 are routinely used in the oil field to connect sections of pipe together to form a drill string or other string of pipe which extends through a portion of the length of the wellbore. Joint 31 also connects to a similar assembly composed of inner and outer pipes 32 and 33 joined in the same manner as disclosed hereinabove for pipes 1 and 2 by way of a rigid connector means 34. The adjacent ends of the two assemblies do not abut one another but are spaced apart a distance 35 which, in the embodiment of FIG. 8, is left open.

Figure 2:
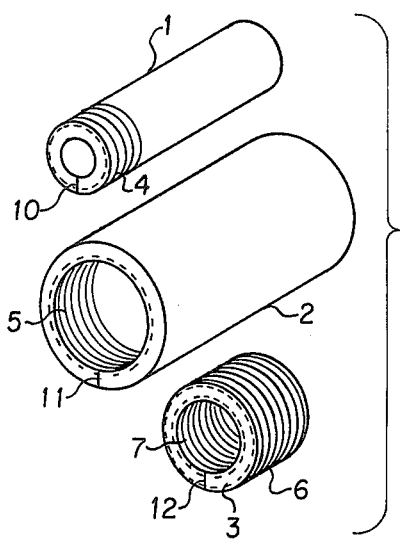
FIG. 2 shows an end view of the pipes and connector means of FIG. 1.
Figure 6:
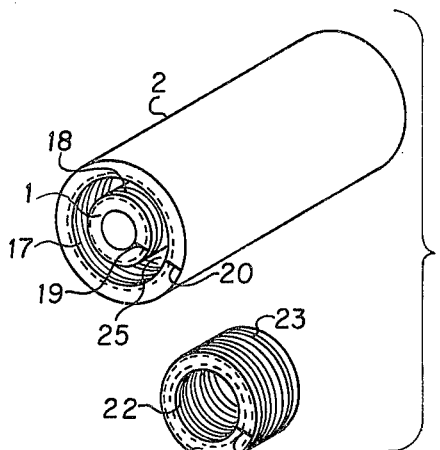
FIG. 6 shows an end view of the unconnected ends of the assembly of FIG. 5 and a connector means.

One series of manufacturing steps in accordance with this invention for the assembly of FIG. 8, would be: machine end plug 3, FIG. 1; machine threads 4, FIG. 2; machine threads 5, FIG. 1; assemble end, FIG. 3; machine end plug 21, FIG. 6; use scribe marks 24, FIG. 6; make end cut with tool 16, FIG. 4; scribe marks 19 and 20, FIG. 6; machine threads 17, FIG. 5; machine threads 18, FIG. 5; assemble end, FIG. 7; face off end 1, FIG. 7; machine threads 30, FIG. 8; face off end 2, FIG. 7; machine threads 30, FIG. 8; and install joint 31, FIG. 8. Assembly of the various parts may or may not take place in the machining lathe.

Connector means 3 and 34 in FIG. 8 are shown with depressions 3' and 34', respectively, which are designed to receive a tool for screwing the connector means into the annulus.

If desired, a seal means can be associated with the connector means to provide a pressure sealed assembly. For example, a small weld of insufficient size to substantially alter the metallurgical properties of pipe 1 can be made at 36 to provide a seal means. Pipe could be heat treated before welding to minimize the effects of the weld on the pipe's desired metallurgical properties. Also, if desired, a conventional O-ring assembly as shown at 37 could be provided as a seal means. Other seal means such as conventional metal seals, adhesives, or even carefully designed thread interferences can be employed as would be obvious to one skilled in the art. One type of seal means or a combination of two or more types of seal means can be employed in a single assembly end.

Figure 9:
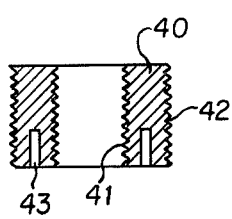
FIG. 9 shows a cross section of one embodiment of a connector means according to this invention.

FIG. 9 shows one embodiment of a connector means whose body 40 has inner and outer threads 41 and 42 but which also has an annular portion 43 which can either be a hollowed out portion (so long as the amount hollowed out does not weaken the body below the strength of the connecting threads between the connector means and the adjacent pipe) or an insert of thermal insulating material. Whether section 43 is simply an air space or an insert of thermal insulation, the net effect is that the connector means is reduced in its capability for thermal transmission between the inner and outer pipes.

Figure 10:
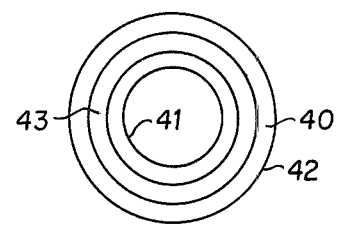
FIG. 10 shows an end view of the connector means of FIG. 9.

FIG. 10 shows an end view of FIG. 9 and clearly shows the annular section 43. Tool depressions 3' or 34' in FIG. 8 would not be annular in configuration but merely cylindrical holes and would not provide the thermal insulating characteristics of annulus 43.

Figure 11:
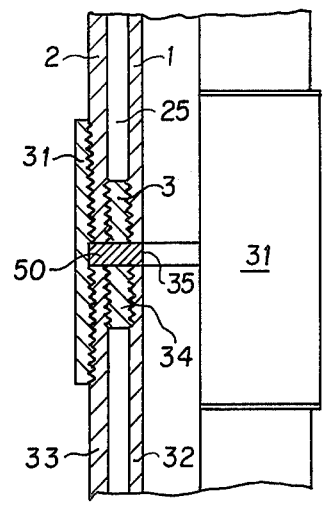
FIG. 11 shows a partial cross section of two assemblies of FIG. 7 joined together as they would appear in the wellbore itself, this construction using a seat means between the two assemblies.

FIG. 11 shows a joint similar to FIG. 8 except that annular space 35 is filled with a seat means which is abutted on its upper end by the ends of pipes 1 and 2 and connector 3, and abutted on its lower side by the ends of pipes 32 and 33 and connector means 34, thereby providing continuous physical connection through the joint. Seat means 50 can be a physically separate element or can be attached to one or more of the adjacent elements present. For example, seat means 50 could be fixed to connector 3 or connector 34 or one of the inner or outer pipes 1, 2, 32, or 33, or to collar 31. Seat means 50 can be a thermal insulating material or could be a metal element containing a thermal insulating material in an annular groove or an open groove as discussed hereinabove with respect to connector 40 of FIG. 9. Also, seat means 50 could just be an annular metallic element for the opposing double-walled assemblies to abut against.

A plurality of assemblies as shown in FIG. 7 could be joined together in a manner such as that shown in FIGS. 8 or 11 or any other manner desired by one skilled in the art to provide a continuous length of double-walled pipes which would extend for the length of the wellbore in the permafrost zone and perhaps even a slight distance beyond the permafrost zone depending upon the particular situation of any given well. The double-walled pipe need not be continuous in the permafrost zone, depending upon the particular situation obtaining in a given well.

This invention is useful in any type wellbore that extends through a permafrost zone. For example, this invention can be applied not only to gas and oil wells, but also to injection wells (water, natural gas, steam, etc.), geothermal wells, and the like.

Reasonable variations and modifications are possible within the scope of this disclosure without departing from the spirit and scope of this invention.

The embodiments of the invention in which an exclusive property or privilege is claimed are defined as follows.

1. A method for making a double-walled pipe assembly for use in a permafrost zone in a wellbore in the earth comprising providing two sections of pipe, the first pipe being of smaller outside diameter than the inside diameter of the second pipe so that the first pipe can be inserted into the second pipe and the outer wall of the first pipe spaced from the inner wall of the second pipe to provide an annulus between said pipes, a first end of each of said first and second pipes being threaded, said threads being in the same rotational direction, said first ends being threadably joined by a first connector means, said first connector means being of sufficient size so that it forms an essentially rigid connection between said first and second pipes, the length of the threaded portions on the first ends of said pipes and said first connector means being sufficient to withstand the force requirements to which said assembly is expected to be subjected, threading the outer surface of the second end of said first pipe and the inner surface of the second end of said second pipe, said threads being in the same rotational direction, said threads starting at the same relative points on said second ends of said pipes, marking the thread start points on the second ends of both pipes, providing a second connector means which when threaded will fit into the annulus between said second ends, threading said second connector means on its inner and outer surfaces so the inner thread will mate with the thread on the outer surfaces of said first pipe and the other thread will mate with the thread on the inner surface of said second pipe, said second connector means being of a size and threaded portion length essentially equivalent to said first connector means, starting the threads on the inner and outer surfaces of said second connector means at the same point and marking that point of thread starting, aligning the thread start mark on said second connector means between the thread start marks on the second ends of said pipes and screwing said second connector means into the annulus.

2. A method according to claim 1 wherein all threads rotate in the right-hand direction.

3. A method according to claim 1 wherein threads on the first end of each pipe are marked as to their starting point either before, during, or after said first ends are threaded, said first connector means being threaded on its inner and outer surfaces so the inner thread will mate with the thread on the outer surface of said first pipe and the outer thread will mate with the thread on the inner surface of said second pipe, the threads on the inner and outer surfaces of said first connector means are started at the same point and that point of thread starting is marked, aligning the thread start marks on said first ends of said pipes with one another, aligning the thread start mark on said first connector between the thread start marks on said first ends of said pipes, screwing said first connector into the annulus and, if necessary, machining the second ends of said pipes so that they are in essentially the same plane before said second ends are threaded.

* * * * *